United States Patent [19]
Abdel-Rahman

[11] Patent Number: 5,948,141
[45] Date of Patent: Sep. 7, 1999

[54] METHOD AND APPARATUS FOR PURIFICATION OF A DISCHARGE GAS

[75] Inventor: Mahmoud F. Abdel-Rahman, West Grove, Pa.

[73] Assignee: Hewlett-Packard Company, Palo Alto, Calif.

[21] Appl. No.: 08/940,716

[22] Filed: Sep. 30, 1997

[51] Int. Cl.⁶ ..................................................... B03C 3/36
[52] U.S. Cl. ....................................... 95/78; 96/64; 96/97
[58] Field of Search .................................. 96/26, 62, 88, 96/64, 95, 97; 95/78, 57

[56] References Cited

U.S. PATENT DOCUMENTS

| | | | |
|---|---|---|---|
| 3,768,258 | 10/1973 | Smith et al. | 96/97 X |
| 4,041,768 | 8/1977 | Gibert et al. | 96/97 X |
| 4,046,527 | 9/1977 | Kistemaker | 96/97 X |
| 4,066,526 | 1/1978 | Yeh | 96/64 X |
| 4,955,991 | 9/1990 | Torok et al. | 96/97 X |
| 5,003,774 | 4/1991 | Leonard | 96/88 X |
| 5,053,912 | 10/1991 | Loreth et al. | 96/95 X |
| 5,180,404 | 1/1993 | Loreth et al. | 96/64 X |
| 5,792,241 | 8/1998 | Browitt | 96/97 X |

OTHER PUBLICATIONS

Cobine, James Dillon, *Gaseous Conductors*, Dover Publications, New York, pp. 205–228, 1958.
Hirsh et al, *Gaseous Electronics*, Academic Press, New York, pp. 219–236, 1978.

Primary Examiner—Richard L. Chiesa
Attorney, Agent, or Firm—Mark Z. Dudley

[57] ABSTRACT

Method and apparatus for purification of a discharge gas, wherein the discharge gas is selected from a group of noble gases, and most preferably is helium or argon. The purification of the discharge gas is achieved by attraction and removal of at least one ionized contaminant in the discharge gas, wherein the contaminant exhibits an ionization potential that is less than the excitation potential of the discharge gas. A discharge gas purification system may be constructed to include a discharge chamber, an inlet for supplying a pressurized flow of discharge gas into the discharge chamber, a discharge device for effecting a discharge in the discharge chamber to effect ionization of a contaminant in the discharge gas, and a bleed flow device located with respect to the discharge and to the discharge cathode for electrically attracting and removing a bleed flow of the discharge gas in the discharge chamber. A disproportionate amount of the ionized contaminants thus created are captured in the bleed flow. An outlet may be provided for directing an output flow of the discharge gas from the discharge chamber to provide purified flow of discharge gas.

5 Claims, 5 Drawing Sheets

METHOD AND APPARATUS FOR PURIFICATION OF A DISCHARGE GAS

FIELD OF THE INVENTION

This invention relates generally to gas purification systems, and particularly to a discharge gas purification system for use in a discharge ionization detector.

BACKGROUND OF THE INVENTION

In the field of chemistry, noble gases are known as essential components in a variety of chemical processes that may have useful application. For example, noble gases are advantageously employed in the operation of a variety of analytical instruments for the purpose of performing one or more chemical reactions that are important to a particular analytical process. The accuracy, if not the success, of such processes is often dependent upon the purity of the noble gas that is supplied to the instrument.

One example of an analytical instrument includes a discharge ionization detector, which operates by applying a high voltage across a set of electrodes that are located in a discharge chamber filled with a discharge gas typically selected from the group of gases known as noble gases. In the presence of a noble gas such as helium, a characteristic discharge emission of photons occurs in the vicinity of the electrodes. The photons irradiate a port connecting the discharge chamber to an ionization chamber that receives a sample gas that typically contains an analyte of interest. Electrons are produced in the ionization chamber as a result of photon interaction with ionizable molecules in the sample gas. Helium metastables are also generated in the vicinity of the discharge emission and are typically transferred from the discharge chamber to the ionization chamber for ionization of the analyte. The magnitude of the ionized analyte molecules is manifested as a current that can be measured to ascertain the composition of one or more components in the analyte.

However, contaminants in the discharge gas are known to degrade the sensitivity of the discharge ionization detector. It is thought that the presence of such ionized contaminants will quench the generation of the helium metastables. As a result, the minimum detectable level (MDL), and the dynamic range, of the detector is degraded.

Accordingly, there exists a need in the field of process chemistry for a system for purification of the discharge gas such that contaminants are reduced if not eliminated.

Further, although the design of discharge ionization detectors continues to be an object of study in the prior art, there nonetheless exists a particular need for a discharge ionization detector having a detector response that exhibits an improved dynamic range, lower minimum detectable level, and greater signal to noise ratio.

SUMMARY OF THE INVENTION

The present invention is directed to methods and apparatus for purification of a discharge gas, wherein the discharge gas is selected from a group of noble gases, and most preferably is helium or argon.

As described herein, the purification of the discharge gas is contemplated as being achieved by capture and removal of at least one contaminant in the discharge gas, wherein the contaminant exhibits an ionization potential that is less than the excitation potential of the discharge gas.

In a first embodiment of the present invention, a discharge gas purification system may be constructed to include a discharge chamber, inlet means for supplying a pressurized flow of discharge gas into the discharge chamber, discharge means for effecting a discharge in the discharge chamber to effect ionization of contaminants in the discharge gas, and bleed flow means located with respect to the discharge and to the discharge cathode for electrically attracting and removing of a portion of the discharge gas in the discharge chamber. Because the abundance of photons and metastables in the discharge zone can ionize other molecules or atoms, the contaminants that are present will be ionized in a greater proportion than the atoms of the discharge gas. The disproportionate amount of the ionized contaminants thus created are electrically attracted to the discharge cathode, where they are susceptible to entering the bleed flow from the discharge chamber into the bleed flow means. Because the pressurized flow of discharge gas continues to flow into discharge chamber, an outlet means may be provided for directing an output flow of the discharge gas from the discharge chamber, to thus provide a purified flow of discharge gas.

The desired removal of ionized contaminants in the bleed flow carried in the bleed flow means is particularly enhanced by provision of an electrically-insulating annular restrictor and an inlet that are located adjacent the discharge zone, whereby the bleed flow means is located to take up a bleed flow from the vicinity of the discharge, such that a major portion of the ionized contaminants are swept out of the discharge zone.

Detector response in a discharge ionization detector is based on an accurate measurement of the ionized analyte of interest. The efficiency of the generation of metastables and photons from a discharge in a volume of discharge gas will therefore establish certain advantageous characteristics of the detector response, such as the level of lowest measurable concentration of the analyte that can be detected. Accordingly, the present invention is also directed to a method and apparatus for purification of a discharge gas supplied to a discharge ionization detector, for effecting more efficient production and use of metastables in the discharge ionization detector, to thereby effect an improved dynamic range, lower minimum detectable level (MDL), and greater signal to noise ratio in the detector response.

A preferred embodiment of the invention includes a system for purification of a discharge gas in a volume defined by a discharge chamber in a discharge ionization detector, wherein the discharge gas is selected from a group of noble gases, and most preferably being helium or argon. An initial flow of the discharge gas is supplied to the discharge chamber so as to cause metastables and photons to be generated due to the presence of a discharge in the discharge chamber. Contaminants in the initial flow of discharge gas are ionized by the discharge and thus are susceptible to migration from a discharge zone to a bleeder structure having bleeder inlets located in the ionization chamber. A bleed flow of discharge gas, which then carries a disproportionate fraction of the contaminants, is bled away from the discharge chamber by the bleeder structure. The majority of the volume of discharge gas in the discharge chamber thereby exhibits greater purity than the initial flow of the discharge gas supplied to the ionization chamber.

Because metastables play an important role in the desired ionization of analyte of interest, the greater purity of the discharge gas in the discharge chamber will substantially reduce the quenching of the metastables and thereby improve the sensitivity of the detector. Preferred embodiments of the bleeder structure may be expected to increase the efficiency of the bleed flow of ionized from the vicinity of the discharge in the discharge chamber, thus increasing the share of ionized contaminants that are removed from the discharge chamber. These embodiments can further improve the delivery of useful metastables to the ionization chamber. Improved dynamic range, lower minimum detectable level (MDL), and greater signal to noise ratio in the detector response is realized due to a greater number of metastables that are delivered to the ionization chamber.

One aspect of the present invention is thereby to provide a discharge ionization detector that employs a discharge chamber and means for effecting a discharge to provide ionization of an analyte in an adjacent ionization chamber, wherein the discharge chamber includes a bleed flow means for attracting and removing of ionized contaminants present in the discharge chamber.

In another aspect of the invention, the desired bleed flow is particularly enhanced by provision of a bleed flow means located in the vicinity of the discharge zone whereby the bleed flow guide is located to take up a bleed flow from the vicinity of the discharge, such that ionized contaminants are rapidly swept out of the discharge chamber prior to the onset of quenching.

According to a preferred embodiment of the invention, there are provided a discharge source means located in a discharge chamber, means for introducing a flow of discharge gas into the discharge chamber, a flow guide that directs the discharge gas flow between the discharge chamber and an adjacent ionization chamber, bleed flow means for removing a bleed flow of ionized contaminants from the discharge chamber, means for introducing a flow of sample gas containing an analyte into the ionization chamber, and means for venting the sample gas and the discharge gas mixture from the ionization chamber. At least one inlet in the bleed flow means is constructed to facilitate electrical attraction of ionized contaminants from the discharge chamber.

In another aspect of the invention, efficient bleed flow is particularly enhanced by integration of a bleed flow guide in a hollow discharge cathode so as to develop the bleed flow from the tip of the discharge cathode, whereby the tip of the discharge cathode is proximate the discharge, or from bores appropriately located in the side walls of the discharge cathode so as to be proximate to the discharge, so as to effect rapid removal of the ionized contaminants.

According to another preferred embodiment of the invention, a discharge ionization detector in accordance with the present invention may be constructed to include a detector body defining a first chamber in the form of a discharge chamber and a second chamber in the form of an ionization chamber, these first and second chambers being coaxially disposed and having a common internal wall shaped as a flow guide having an array of plural, closely-spaced parallel bores, wherein each bore includes input and outlet apertures therein. A discharge source is provided in the discharge chamber for effecting a discharge in the presence of a discharge gas. The body includes: an inlet to the discharge chamber for admitting an initial flow of discharge gas, preferably provided in the form of a pressurized stream of a noble gas such as helium; a bleed flow means for removing a bleed flow of discharge gas taken from the discharge chamber, whereby the bleed flow contains ionized contaminants; and an inlet to the ionization chamber for admitting a flow of sample gas to be analyzed. The central region of the flow guide includes the array of plural bores so situated as to direct purified discharge gas flow in a direction away from the discharge chamber and into the ionization chamber. The flow guide also suppresses fluid flow in the reverse direction. The discharge source includes an electrode assembly that includes at least a discharge cathode situated in an insulating sleeve through the detector body so as to extend into the discharge chamber, and at least one protrusion situated in the interior wall of the discharge chamber that extends into the volume of the discharge chamber and is opposite an exposed tip of the electrode assembly. The exposed tip on the discharge cathode is thus located proximate to the protrusion and to the plurality of bores. The resulting discharge is thereby located in a discharge zone between the tip of the discharge cathode and the protrusion; the discharge zone is thus proximate to the array of plural bores. One or more inlets in the bleed flow means are integrated in the discharge cathode and are located within or proximate to the discharge zone so as to cause electrical attraction of the ionized contaminants into the bleed flow. A signal monitoring circuit may be constructed to include the signal cathode, a connection to the ionization chamber wall such that the ionization chamber wall acts as an electrode, means for biasing the signal cathode and the ionization chamber wall for generating an electric field with respect to the exposed portion of the signal cathode to cause positively-charged analyte ions to be accelerated toward the signal cathode, and an electrometer for providing an indication of the analyte ionic current flow between the signal cathode and the ionization chamber wall so as to indicate the amount of ionized analyte components in the sample gas.

In another preferred embodiment of the detector, discharge cathode is provided in the form of an open-ended, conductive tubular member that is coaxially mounted in an insulating sleeve in the detector body so as to project into the discharge chamber. The discharge cathode is biased in a high voltage circuit that includes the common wall such that the tip of the discharge cathode and the protrusion cause the discharge zone to occur therebetween. A portion of the discharge gas that will ultimately form the bleed flow then effectively sweeps the discharge zone. A bleed flow inlet is located at the open end at the tip of the tubular discharge cathode. The bleed flow inlet is centrally disposed with respect to the tip of the discharge cathode and is located adjacent the discharge zone. The bleed flow inlet communicates with a central coaxial passage in the discharge cathode that forms a bleed flow guide. The opposing end of the discharge cathode then provides an outlet for the bleed flow.

In another embodiment of the invention, the discharge gas inlet to the discharge chamber preferably directs the flow of discharge gas into the discharge chamber from discharge gas inlets located at the base of the discharge cathode. The initial flow of the discharge gas is provided in a direction parallel to the central axis of the discharge cathode.

BRIEF DESCRIPTION OF THE DRAWINGS

The foregoing and other features and advantages of the invention will be apparent from the following more particular description of preferred embodiments of the drawings, in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

The apparatus and methods of the present invention may be employed for purification of a supply of a discharge gas selected from the group of gases known as noble gases, wherein the discharge gas may include at least one contaminant that exhibits an ionization potential that is lower than the excitation potential of the discharge gas.

The apparatus and methods of the present invention may be employed in particular to improve the operation of a discharge ionization detector for detection of an analyte that may be present in a variety of sample fluids. Gases are the preferred sample fluids according to the practice of the present invention, and therefore the following description of the invention will include a description of the arrangement, construction, and operation of a novel discharge ionization detector for use in a gas sample analytical system. One particular application of the contemplated discharge ionization detector is in a chromatographic analytical system (hereinafter, a chromatograph); however, other applications such as process sampling systems, gas leak detection systems, air quality monitoring systems, and the like are contemplated.

Embodiments of the invention described herein are useful in purification of a flow of discharge gas supplied to a discharge ionization detector in a gas chromatograph. The preferred operation of the contemplated discharge ionization detector with respect to a conventional gas chromatograph may be understood as follows. In a chromatographic separation of a given sample compound, a sample is injected with a pressurized carrier gas into a separation column and the column effluent is directed as a fluid stream of sample gas into the discharge ionization detector. One or more pneumatic manifold assemblies are envisioned, each of which serves in part to control and redirect a plurality of gas flows, including the carrier gas and a discharge gas. Accordingly, the pneumatic manifold may be operated to effect a modulation of the aforementioned gas flows, and in particular to supply a modulated supply of discharge gas flow to the discharge ionization detector described herein.

Figure 1:
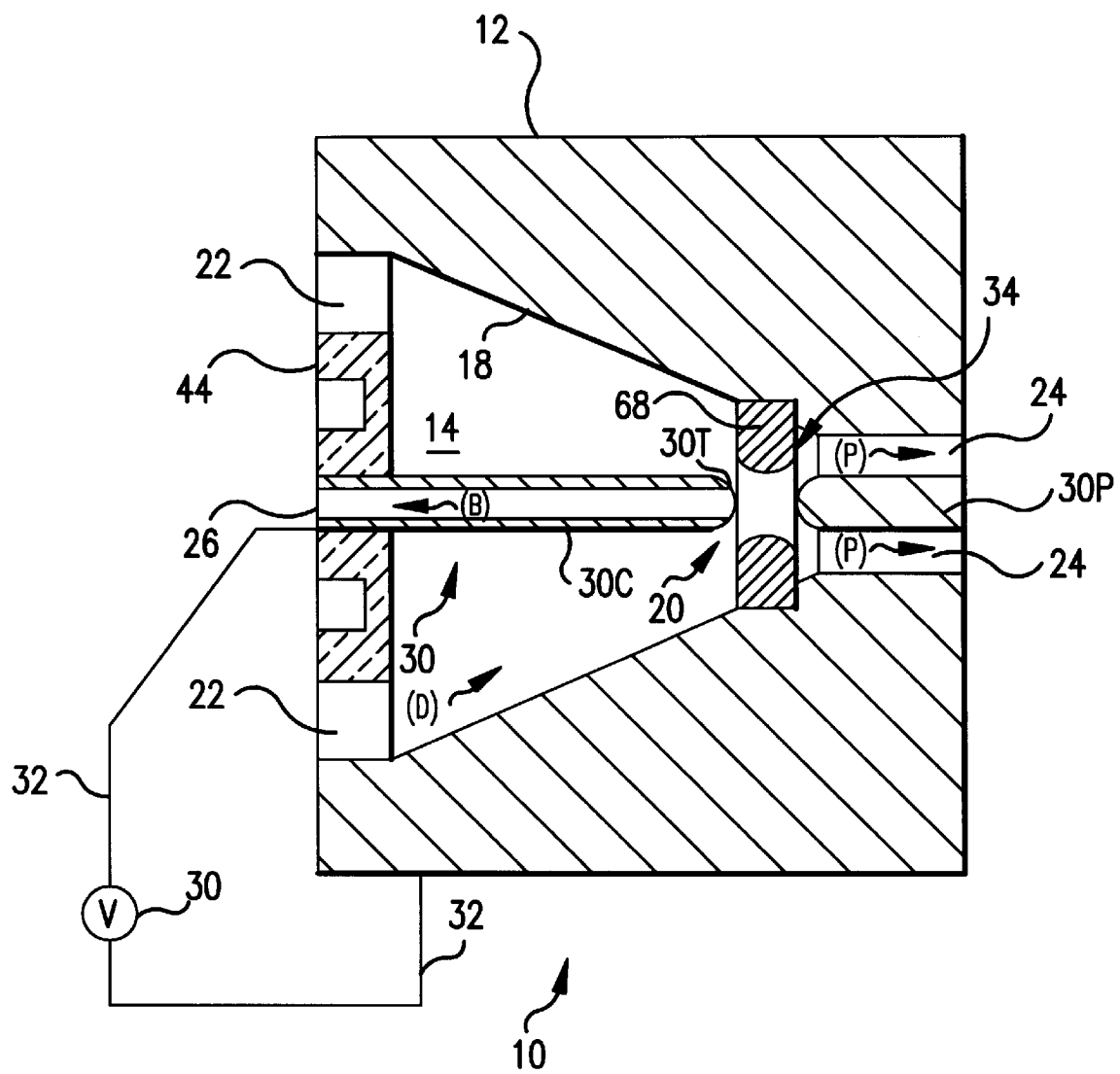
FIG. 1 is a simplified schematic view of a discharge gas purification system of the present invention.

As illustrated in FIG. 1, a preferred embodiment 10 of a system for purification of a discharge gas may be constructed according to the invention to include a body 12 preferably constructed to include a discharge chamber 14, wall 18, a bleed flow means including a bleed structure having a bore 20 that includes a narrow-bore bleed flow inlet 26 and a bleed flow restrictor 68 composed of an insulating material. A discharge gas inlet 22 is provided for admitting a controlled flow of discharge gas, preferably one of the noble gases such as helium, and one or more purified discharge gas outlets 24 for delivering a flow of purified discharge gas.

In the illustrated embodiment, the discharge gas inlet 22 directs a flow of pressurized discharge gas (D) transversely to the direction of a bleed flow (B) from the discharge chamber 14 through the bore 20; however, other configurations are within the scope of the present invention.

A discharge source includes an electrode assembly 30 located in the interior of the discharge chamber 14. The electrode assembly 30 includes a discharge cathode 30C for generating a discharge with respect to a second electrode provided in the form of a protrusion 30P from the interior surface of the wall 18. The electrode assembly 30 and the wall 18 are connected, by way of appropriate electrical connectors 32, to a discharge voltage potential (V) applied between the discharge cathode 30 and the protrusion 30P. A discharge zone 34 is thereby situated at the tip 30T of the discharge cathode 30C. A bleed flow means includes an annular restrictor 68, formed of electrically insulating material, that is located adjacent the tip of the discharge cathode 30C such that ionized contaminants are predisposed to migrate via electrically attraction to the tip of the discharge cathode 30C. The bleed flow means further includes a bore 20 communicating with an inlet 26 at the tip of the discharge cathode 30C. Ionized contaminants are thereby directed to migrate to the tip of the discharge cathode 30C where they are then swept into the inlet 26 and out of the discharge chamber 14 due to the bleed flow (B) through the bore 20. In the illustrated embodiment, the electrode assembly 30 is disposed in close proximity to, and in substantially coaxial alignment with, the central axis of the annular restrictor 68. The tip of the discharge cathode 30C is advantageously disposed within the discharge chamber 14 so as to locate the inlet 26 of the bore 20 in close proximity with the discharge zone.

The body 12 is preferably constructed of a one or two-part cylindrical configuration. In the illustrated embodiment, the body 12 may be of a one-piece, unitary construction having the discharge chambers 14 machined therein. The discharge gas inlet 22 and outlets 24 may suitably be passageways extending through the wall 18 of the body 12. The discharge gas (D) is conducted into the discharge chamber 14 via a suitable fitting (not shown) that may be mounted on the exterior of the housing. The bleed flow (B) of the discharge gas is conducted out of the discharge chamber 14 via a suitable fitting (not shown) that may be mounted on the exterior of the body 12 adjacent the exterior of the bore 20. The purified discharge gas (P) is conducted out of the discharge chamber 14 via a suitable fitting (not shown) mounted on the exterior of the body 12 adjacent the outlets 24.

A major portion of the body 12 itself is electrically conductive and is preferably made of a metal material or other electrically conductive materials. The discharge cathode 30C is fitted in a circular insulating adapter 44 that is adapted to be placed into the body 12 to seal the discharge cathode 30C to the discharge chamber 14. The adapter 44 is held in position by appropriate means (not shown).

Figure 2:
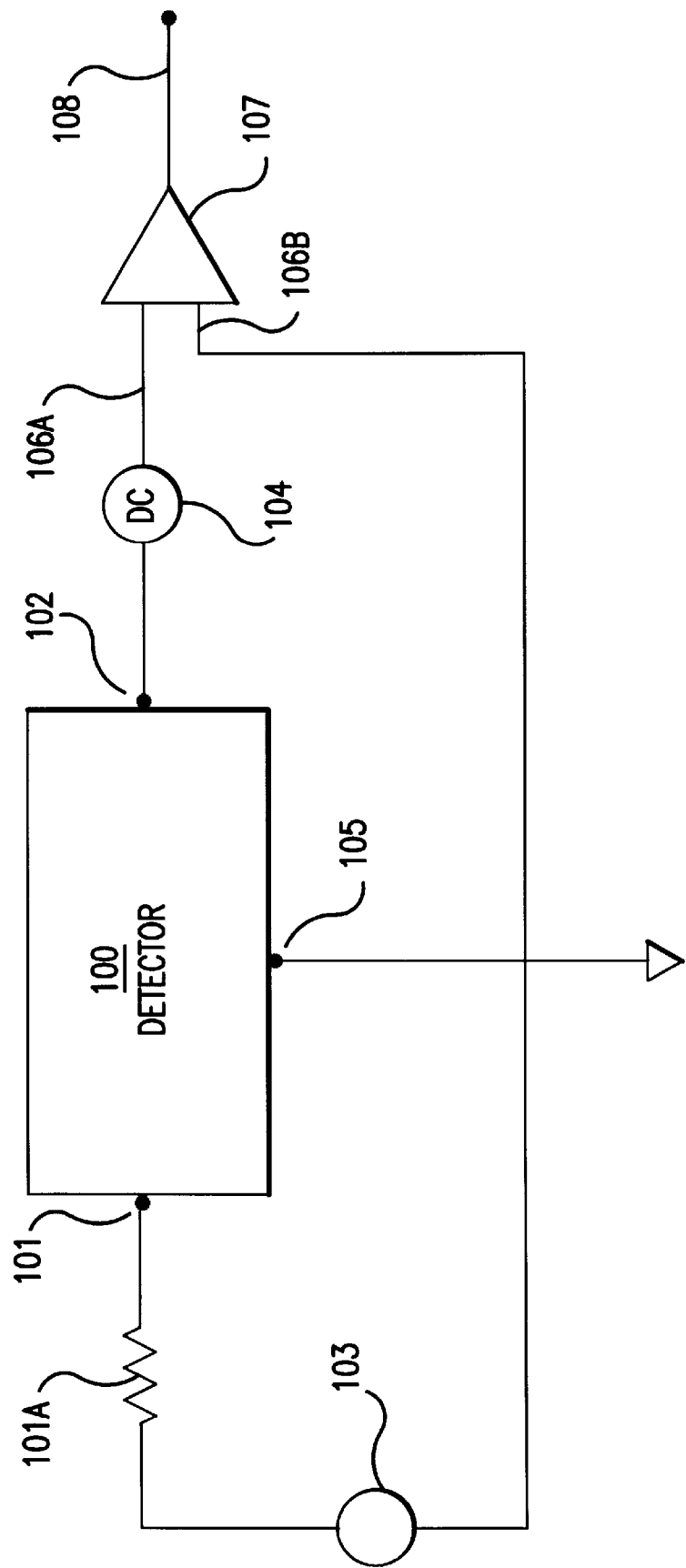
FIG. 2 is a simplified schematic view of a discharge ionization detector of the present invention.

As illustrated in FIG. 2, a preferred embodiment 100 of a discharge ionization detector constructed according to the invention includes a discharge cathode connector 101 connected to a high voltage discharge supply 103. The detector further includes a signal cathode connector 102, a signal bias voltage supply 104, and a common connector 105 (which is connected to a ground potential). Differential inputs 106A, 106B in an electrometer 107 may be connected to the signal bias voltage supply 104 and the common connector 105 so as to provide a detector output signal on a detector output signal line 108 for measuring the current passing between the signal cathode connector 102 and the common connector 105.

Figure 3:
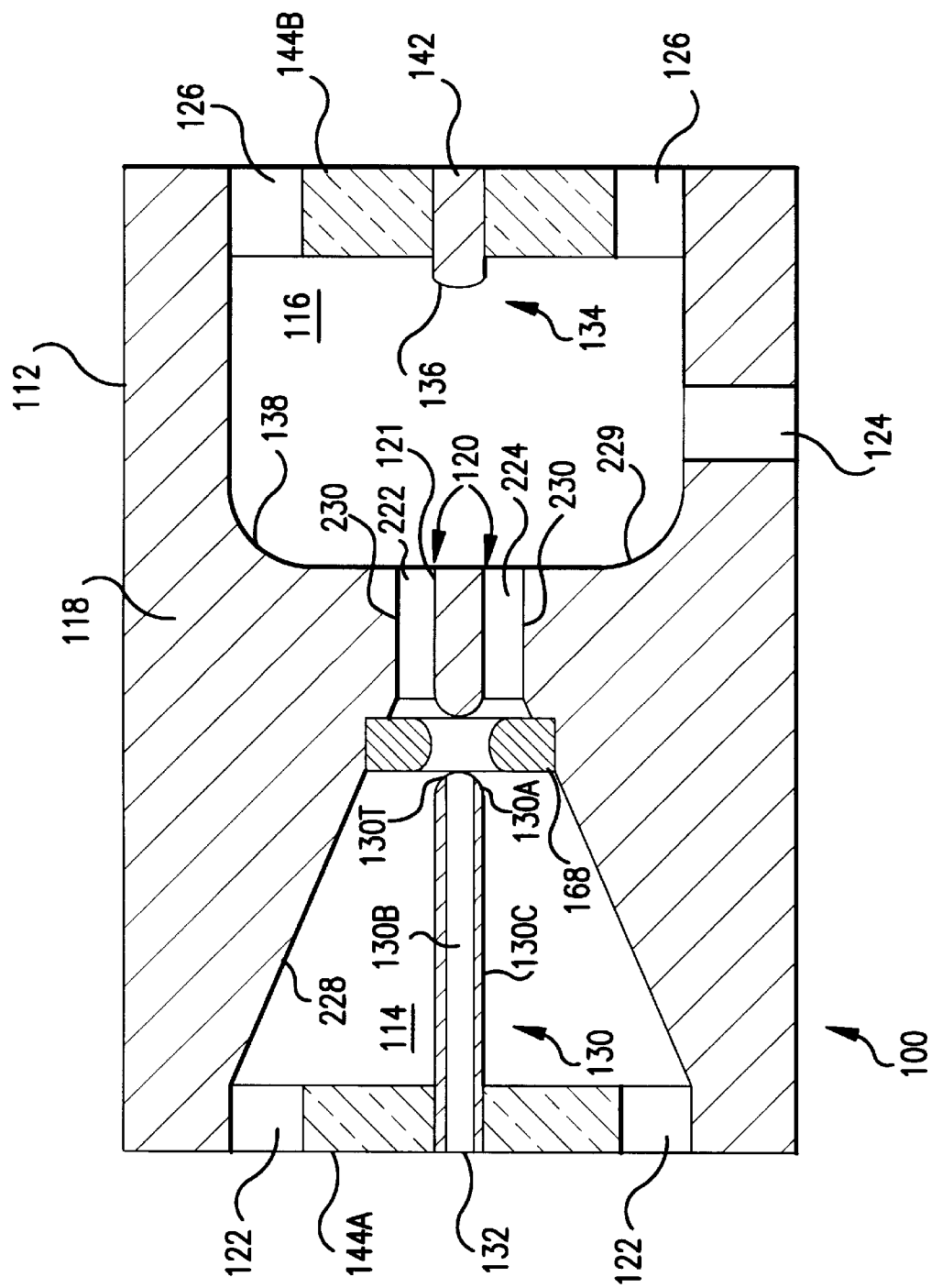
FIG. 3 is a schematic cross-sectional view of an embodiment of a portion of the discharge ionization detector of FIG. 2.
Figure 4:
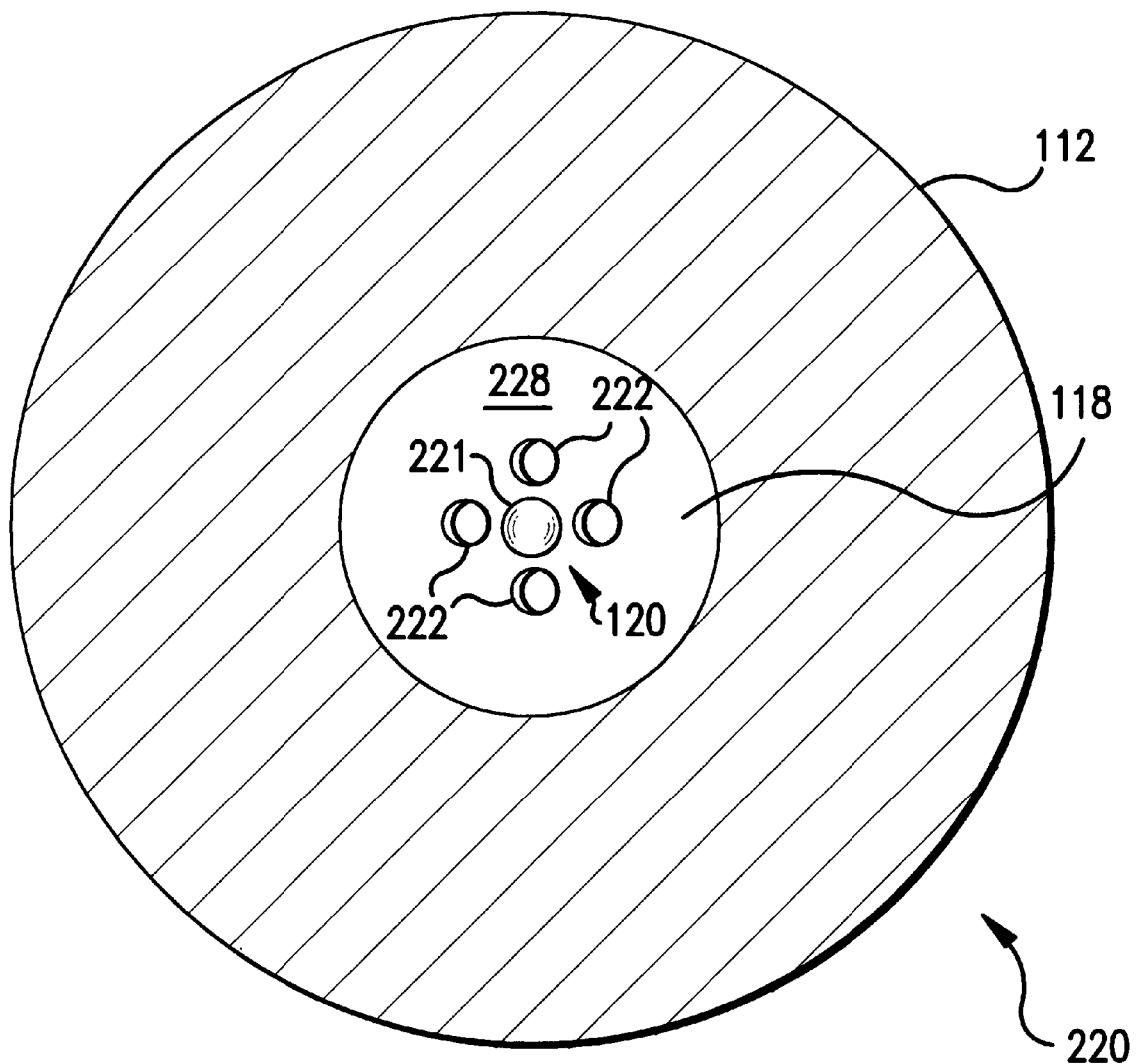
FIG. 4 is a sectional view of a flow guide in the detector shown in FIG. 3.

As illustrated in FIGS. 3–4, the preferred embodiment 100 of the discharge ionization detector includes a detector body 112 defining first and second chambers preferably constructed as discharge chamber 114 and ionization chamber 116, respectively, which are coaxially disposed and have a common internal wall 118 having an aperture array 120 therein. The volume of the ionization chamber 116 is preferably in the range of 25 to 250 microliters and in some applications may be less than one microliter and as large as 1 milliliter. The body 112 includes inlets 122 for admitting a controlled flow of discharge gas, preferably selected as one of the noble gases such as helium, and an inlet 124 to the ionization chamber 116 for admitting a sample gas having an analyte to be detected. In the illustrated embodiment, the sample gas input 124 directs the flow of sample gas transversely to the discharge of the discharge gas entering the chamber through the outlet ends of aperture array 120; however, other configurations are within the scope of the present invention. Vent outlets 126 in the ionization chamber 116 are also provided. A high-voltage discharge source includes a first electrode assembly 130 provided in the discharge chamber 114. The first electrode assembly 130 includes a hollow discharge cathode 130C for generating a discharge zone proximate to a portion of the common wall 118, such as a protrusion 221, that is situated adjacent the aperture array 120. The first electrode assembly 130 is connected, by way of an appropriate electrical connector (not shown) to a discharge voltage potential applied between the first electrode assembly 130 and the common wall 118. As a result, a discharge occurs between the tip 130T of the discharge cathode 130C and the protrusion 221. The desirable products of the ionization process, such as metastables, are swept into the ionization chamber 116, and the undesirable products, such as ionized contaminants, are electrically attracted to a bleed flow means incorporated in the discharge cathode 130C. Preferably, the bleed flow means includes an electrically insulating annular restrictor 168, a bore 130B, and an aperture 130A in the tip 130T that communicates with the bore 130B. The ionized contaminants are attracted to the aperture 130A and are swept into the bore 130B of the discharge cathode 130C so as to be removed by way of the bleed flow exiting from the discharge chamber 114 at an outlet 132.

A second electrode assembly 134 is provided in the ionization chamber 116. The second electrode assembly 134 includes a signal cathode 136, to be negatively charged, for generating an electric field with respect to the interior wall 138 of the ionization chamber 116. The signal cathode 136 preferable presents a small surface area to the ionization chamber 116 to avoid exposure to photons and the resulting noise artifacts. Preferably, the interior wall 138 and the common wall 118 are electrically coupled and thus are at the same potential voltage. The signal cathode 136 is provided with a negative charge by coupling through electrical connector 142 to a polarizing voltage source (supply 104 in FIG. 2). The interior wall 138 may be coupled to an electrometer by an appropriate electrical connector (connector 105 in FIG. 2), so as to provide for an indication of the amount of ionized components in the analyte.

In the illustrated embodiment, the detector body 112 is preferably constructed of a one or two-part cylindrical configuration. In the illustrated embodiment, the detector body 112 may be of a one-piece, unitary construction having the discharge and ionization chambers 114, 116 machined therein. The discharge gas inlet 122, sample gas inlet 124, and vent outlets 126 may suitably be passageways extending through the wall of the detector body 112 into the respective chambers 114, 116. A major portion of the detector body 112 itself is electrically conductive and is preferably made of a metal material or other electrically conductive materials.

The electrode assemblies 130, 134 are respectively fitted in circular insulating adapters 144A, 144B that are each adapted to be placed into the detector body 112 to seal respectively the discharge chamber 114 and the ionization chamber 116. The adapters 144A, 144B are held in position by appropriate means (not shown). The discharge gas is conducted into the discharge chamber 114 via a suitable fitting (not shown) that may be mounted on the adapter 144A The sample gas to be analyzed is conducted into the ionization chamber 116 via a suitable fitting mounted on the adapter 144B (not shown).

Referring to FIG. 4, an interior plan view of the common wall 118 is illustrated. The geometry of aperture array 120 is preferably such that the ratio of the length to the diameter of each of the bores 230 is greater than one, and is on the order of two to five. Such geometry enhances the proximity of the ionization chamber 116 to the discharge chamber 114 and reduces the path length encountered by the metastables in their travel from the discharge chamber 114 to the ionization chamber 116.

The common wall between the discharge chamber and the ionization chamber 116 is shaped as a flow guide 220 and is located at the common portion of the body 112 between the discharge chamber 114 and the ionization chamber 116. The flow guide 220 functions as one of the boundaries of the inner volume of the ionization chamber 116 in which analyte ionization takes place. The flow guide 220 thereby separates the active volume from the discharge chamber 114. The flow guide 220 includes plural bores 230 that are preferably symmetrically arranged about a surface region in the flow guide that is proximate to the tip 130T; in particular, one or more protrusion(s) 221 may be provided. The arrangement of protrusion 221 facilitates the development of the desired discharge in the immediate vicinity of apertures 222. For this purpose, the flow guide 220 and associated common connector 105 are electrically connected and similarly composed of a conductive material, such as stainless steel. The flow guide 220 is generally shaped like a disk, being thinner in the region of the bores 230, and having a generally cylindrical section with first and second major surfaces 228, 229 whereby the plurality of bores 230 extend through a central portion of the flow guide 220. Each bore 230 includes an input aperture 222 and an outlet aperture 224. Preferably the protrusion 221 is integral with the first major surface 228 so as to terminate in a bulbous region suitable for exciting the desired discharge. The flow guide 220 may alternatively be an insert fitted in the body 112 and sized such that its minor sides are engaged with the interior of the body when the flow guide 220 is fitted between the discharge chamber 114 and the ionization chamber 116.

The bores 230 facilitate the passage of discharge gas from the discharge gas inlet 122 and through the bores 230 into the ionization chamber 116 and thus towards the signal cathode 136. The discharge chamber 116 preferably exhibits a cup-shaped section being so designed and positioned such that the discharge gas can be rapidly swept through the glow discharge and into the input apertures 222 and then through the bores 230. The ionization chamber 116 preferably exhibits a cone-shaped section being so designed and positioned such that the sample gas can be directed as a pressurized stream into the ionization chamber 116. Further flow of the sample gas is constrained by the lower major surface 229 of the flow guide 222 and by the interior wall 138 of the ionization chamber 116 such that the mixture of the sample gas and the discharge gas is swept around the signal cathode 136. The mixture of the sample gas and the discharge gas is permitted to exit the ionization chamber 116 through the vents 126.

Another aspect of the illustrated embodiment is that the portion of the purified discharge gas that flows through the flow guide 220 is rapidly moved downstream from the glow discharge, due to the pressure of the discharge gas and the sufficiently small internal diameter of the bores 230. This encourages good distribution and ionization of the sample molecules in the ionization chamber 116, while minimizing the migration of gases, contaminants, sample molecules, and so on from the ionization chamber 116 into the discharge chamber 114.

Figure 6:
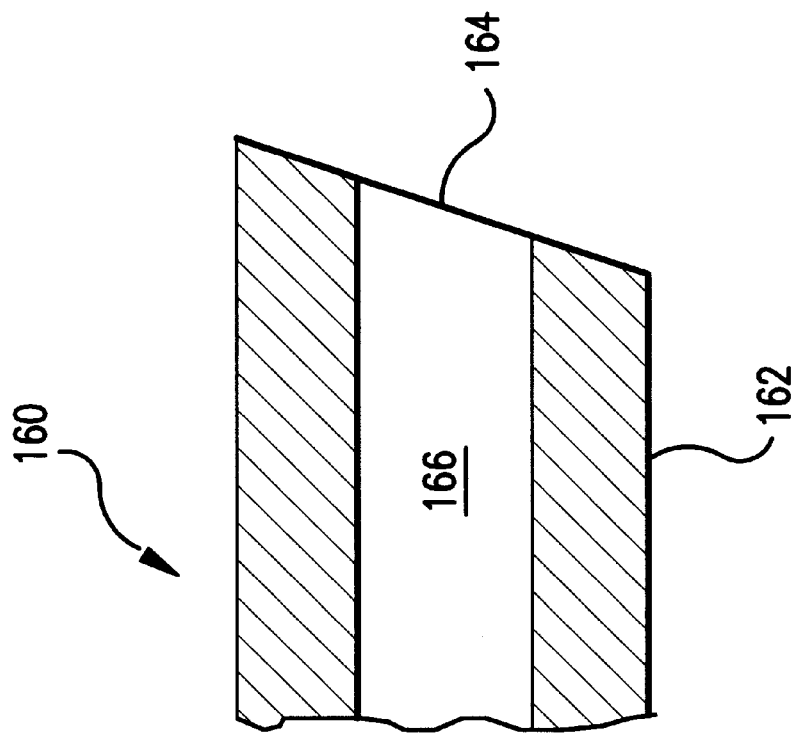
FIGS. 5 and 6 are side sectional views, respectively, of first and second alternative embodiments of a discharge cathode preferred for use in the detector shown in FIG. 3.
Figure 5:
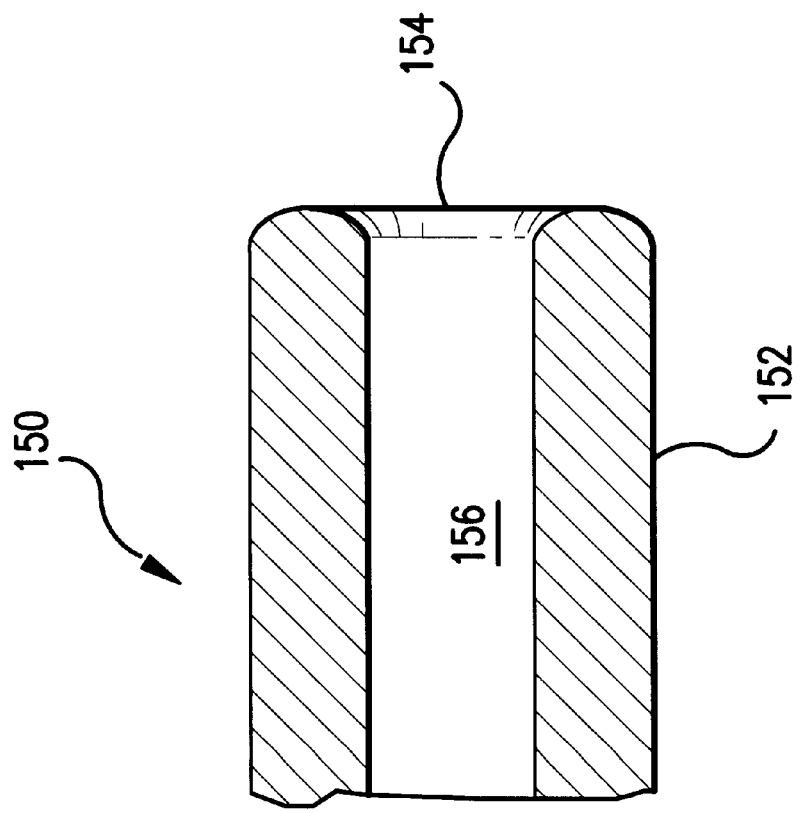

As was described with respect to FIG. 3, one preferred embodiment of the discharge electrode assembly 130 may be constructed to include a hollow discharge cathode 130C. As illustrated in FIGS. 5 and 6, alternative embodiments of the discharge cathode 130 are contemplated. One such alternative embodiment includes a hollow discharge cathode 152 having a central bore 156 that communicates with a blunt annular tip 154. Another alternative embodiment includes a discharge cathode 162 having a central bore 166 that communicates with an acutely angled annular tip 164 that is constructed to better confine the location of the discharge zone.

What is claimed is:

1. A system for purification of a discharge gas, wherein the discharge gas is selected from a group of noble gases, comprising:

a discharge chamber, inlet means for supplying a pressurized flow of a discharge gas mixture into the discharge chamber, the mixture including the discharge gas and at least one contaminant;

glow discharge means for effecting a sub-corona level of glow discharge in the discharge chamber to effect ionization of the contaminant in the discharge gas mixture;

bleed flow means having an inlet located with respect to the discharge for electrically attracting the ionized contaminant and for removing the ionized contaminant in a bleed flow portion of the discharge gas mixture in the discharge chamber; and an outlet means for directing an output flow of the portion of the discharge gas mixture other than the bleed flow from the discharge chamber, to thus provide a purified flow of discharge gas.

2. The system of claim 1, further comprising a discharge cathode and wherein the bleed flow means further comprises means for electrically attracting the ionized contaminants to the discharge cathode for collecting a disproportionate amount of the ionized contaminants.

3. The system of claim 2, wherein the bleed flow means is integrated in the discharge cathode.

4. The system of claim 3, wherein the bleed flow means further comprises an insulating restrictor located proximate to the bleed flow inlet and the discharge zone, whereby the bleed flow inlet is located to take up bleed flow from the vicinity of the discharge, such that a major portion of the ionized contaminants are swept out of the discharge zone and into the bleed flow inlet.

5. A method of purification of a discharge gas, wherein the discharge gas is selected from a group of noble gases, comprising:

providing a discharge chamber, supplying a pressurized flow of a discharge gas mixture into the discharge chamber, the discharge gas mixture including the discharge gas and at least one contaminant;

effecting a sub-corona level of glow discharge in the discharge chamber to effect ionization of at least one contaminant in the discharge gas;

electrically attracting the ionized contaminant and removing the ionized contaminant in a bleed flow, the bleed flow being taken from the vicinity of the discharge and being formed of a portion of the discharge gas mixture in the discharge chamber; and directing an output flow of a portion of the discharge gas mixture other than the bleed flow from the discharge chamber, to thus provide a purified flow of the discharge gas mixture.

* * * * *